(12) United States Patent
Rollick et al.

(10) Patent No.: US 10,322,528 B2
(45) Date of Patent: Jun. 18, 2019

(54) COLOR CONTROL OF POLYESTER-COBALT COMPOUNDS AND POLYESTER-COBALT COMPOSITIONS

(71) Applicant: M & G USA Corporation, Apple Grove, WV (US)

(72) Inventors: Kevin Rollick, Munroe Falls, OH (US); Gianluca Ferrari, Portogruaro (IT)

(73) Assignee: APG Polytech, LLC, Wilmington, DE (US)

( * ) Notice: Subject to any disclaimer, the term of this patent is extended or adjusted under 35 U.S.C. 154(b) by 161 days.

(21) Appl. No.: 14/357,662

(22) PCT Filed: Nov. 15, 2012

(86) PCT No.: PCT/US2012/065351
§ 371 (c)(1),
(2) Date: May 12, 2014

(87) PCT Pub. No.: WO2013/074835
PCT Pub. Date: May 23, 2013

(65) Prior Publication Data
US 2014/0312525 A1   Oct. 23, 2014

(51) Int. Cl.
C08J 11/06 (2006.01)
B29B 9/12 (2006.01)
C08K 5/00 (2006.01)

(52) U.S. Cl.
CPC .............. B29B 9/12 (2013.01); C08J 11/06 (2013.01); C08K 5/0091 (2013.01)

(58) Field of Classification Search
CPC ...................................................... C08J 11/06
See application file for complete search history.

(56) References Cited

U.S. PATENT DOCUMENTS

| | | | |
|---|---|---|---|
| 3,657,180 A * | 4/1972 | Cohn ................ | C08K 5/098 524/775 |
| 4,499,262 A | 2/1985 | Fagerburg et al. | |
| 4,501,781 A | 2/1985 | Kushida et al. | |
| RE32,765 E | 10/1988 | Callander et al. | |
| 4,837,115 A | 6/1989 | Igarashi et al. | |
| 4,957,980 A | 9/1990 | Kobayashi et al. | |
| 5,021,515 A | 6/1991 | Cochran et al. | |
| 5,258,233 A | 11/1993 | Mills et al. | |
| 5,266,413 A | 11/1993 | Mills et al. | |
| 5,281,360 A | 6/1994 | Hong et al. | |
| 5,340,884 A | 8/1994 | Mills et al. | |
| 5,344,912 A * | 9/1994 | Dalgewicz, III .... | B29C 49/0005 428/34.1 |
| 5,623,047 A | 4/1997 | Yuo et al. | |
| 5,639,815 A | 6/1997 | Cochran et al. | |
| 5,650,469 A | 7/1997 | Long et al. | |
| 5,866,649 A | 2/1999 | Hong et al. | |
| 5,955,527 A | 9/1999 | Cochran et al. | |
| 6,239,233 B1 | 5/2001 | Bell et al. | |
| 6,288,161 B1 | 9/2001 | Kim et al. | |
| 6,346,307 B1 | 2/2002 | Al Ghatta et al. | |
| 6,429,243 B1 * | 8/2002 | Okamoto ................ | C08L 67/02 428/34.2 |
| 6,444,283 B1 | 9/2002 | Turner et al. | |
| 6,734,234 B1 * | 5/2004 | Deardurff ................ | C08J 3/226 521/48 |
| 7,943,216 B2 | 5/2011 | Liu et al. | |
| 2003/0068456 A1 * | 4/2003 | Davis ...................... | B29C 49/02 428/35.7 |
| 2003/0134966 A1 | 7/2003 | Kim et al. | |
| 2006/0246245 A1 † | 11/2006 | Liu | |
| 2007/0088133 A1 | 4/2007 | Heater | |
| 2010/0316824 A1 | 12/2010 | Knudsen et al. | |
| 2011/0281049 A1 * | 11/2011 | Quillen ............... | B29C 47/0016 428/35.8 |
| 2012/0231285 A1 * | 9/2012 | Von Benten ........... | C08K 5/098 428/480 |
| 2015/0353704 A1 * | 12/2015 | Bienmueller ........... | C08L 67/02 521/48 |

FOREIGN PATENT DOCUMENTS

| | | |
|---|---|---|
| JP | 3-193325 A | 8/1991 |
| JP | 2663578 B2 | 6/1997 |
| WO | 2005/023530 A1 | 3/2005 |
| WO | 2007/042230 A1 † | 4/2007 |

OTHER PUBLICATIONS

Acros Organics, "Safety Data Sheet—Dodecylbenzenesulfonic acid, sodium salt", 2010, available online at https://www.fishersci.ca/viewmsds.do?catNo=AC325910250, 7 pages.*

* cited by examiner
† cited by third party

*Primary Examiner* — William P Bell
(74) *Attorney, Agent, or Firm* — Edwin A. Sisson, Attorney at Law, LLC; Jeffrey J. Banyas

(57) ABSTRACT

The present invention is to a composition made from a polyester produced by the acid or ester polyester process, a cobalt salt and a base, preferably an alkaline metal base. The composition can be made by blending a cobalt salt with a polyester which has been polymerized in the presence a alkaline metal ion derived from a basic alkaline metal compound, e.g. alkaline metal base or basic alkaline metal salt. The composition may optionally comprise an ionic compatibilizer, which may further be blended with a partially aromatic polyamide. This blend can be processed into a container having both active and passive oxygen barrier with an improved color and clarity than that achieved by cobalt alone. The use of the cobalt salt in combination with the base can also be used to improve the color of recycled polyester during processing.

6 Claims, No Drawings

COLOR CONTROL OF POLYESTER-COBALT COMPOUNDS AND POLYESTER-COBALT COMPOSITIONS

PRIORITY AND CROSS REFERENCES

This specification claims priority from U.S. Patent Provisional Patent Applications 61/560,802 filed on 16 Nov. 2011, 61/710,652 filed on 5 Oct. 2012 and 61/726,036 filed on 14 Nov. 2012, and International Application Number PCT/US2012/065351 filed on 15 Nov. 2012. The teachings of which are incorporated by reference in their entirety with respect to the compounds, compositions and the teachings both the ester and acid process of manufacturing the compounds and compositions.

BACKGROUND OF THE INVENTION

1) Field of the Invention

The invention relates to the incorporation of cobalt and a base into a polyester produced from the acid or ester process. The composition can be used in compatibilized blends of polyamides in polyesters, a method for forming such compositions, and to containers made from such compositions. Specifically a composition made from the polyester-cobalt-base has less yellowness than other compositions. The blends can be used as passive gas barriers, or active oxygen scavengers when combined with a partially aromatic polyamide or other oxidizable organic compound.

2) Prior Art

Plastic materials have been replacing glass and metal packaging materials due to their lighter weight, decreased breakage compared to glass, and potentially lower cost. One major deficiency with polyesters is its relatively high gas permeability. This restricts the shelf life of carbonated soft drinks and oxygen sensitive materials such as beer and fruit juices.

Multilayer bottles containing a low gas permeable polymer as an inner layer, with polyesters as the other layers, have been commercialized. Blends of these low gas permeable polymers into polyester have not been successful due to haze formed by the domains in the two-phase system.

The preferred polyamide is a partially aromatic polyamide containing meta-xylylene groups, especially poly (m-xylylene adipamide), MXD6.

However, the use of partially aromatic polyamides as the low gas permeable polymer gives an increase in the yellowness of the resultant container.

U.S. Pat. No. 4,501,781 to Kushida et al. discloses a hollow blow-molded biaxially oriented bottle shaped container comprising a mixture of polyethylene terephthalate (PET) resin and a xylylene group-containing polyamide resin. Both monolayer and multilayer containers are disclosed, but there is no information on the color of the bottles.

U.S. Pat. No. 5,650,469 to Long et al. discloses the use of a terephthalic acid based polyester blended with low levels (0.05 to 2.0 wt-%) of a polyamide to reduce the acetaldehyde level of the container. These blends produced lower yellowness containers than a corresponding blend made from a dimethyl terephthalate based polyester, but are still unsatisfactory for the higher levels required to significantly lower (decrease) the gas permeability.

U.S. Pat. Nos. 5,258,233, 5,266,413 and U.S. Pat. No. 5,340,884 to Mills et al. discloses a polyester composition comprising 0.05 to 2.0 wt-% of low molecular weight polyamide. At a 0.5 wt-% blend of MXD6 the haze of the bottle increased from 0.7 to 1.2%. No gas permeation or color data is given.

U.S. Pat. No. 4,837,115 to Igarashi et al. discloses a blend of amino terminated polyamides with PET to reduce acetaldehyde levels. There was no increase in haze with the addition of 0.5 wt-% MXD6, but at 2 wt-% the haze increased from 1.7 to 2.4%. No gas permeation or color data is given.

U.S. Pat. No. 6,239,233 to Bell et al. discloses a blend of acid terminated polyamides with PET that has reduced yellowness compared to amino terminated polyamides. No gas permeation data is given.

U.S. Pat. No. 6,346,307 to Al Ghatta et al. discloses the use of a dianhydride of a tetracarboxylic acid to reduce the dispersed domain size of a blend of MXD6 in PET. The examples did not give color data, but at a 10 wt-% MXD6 blend level the oxygen permeability was reduced from 0.53 to 0.12 ml/bottle/day/atm and the carbon dioxide permeability was reduced from 18.2 to 7.02 ml/bottle/day/atm.

U.S. Pat. No. 6,444,283 to Turner et al. discloses that low molecular weight MXD6 polyamides have lower haze than higher molecular weight MXD6 when blended with PET. The examples did not give color data, but at a 2 wt-% MXD6 (Mitsubishi Chemical Company grade 6007) the oxygen permeability of an oriented film was reduced from 8.1 to 5.7 cc-mil/100 in.sup.2-atm-day compared to 6.1 for the low molecular weight MXD6.

U.S. Pat. No. 4,957,980 to Koyayashi et al. discloses the use of maleic anhydride grafted copolyesters to compatibilize polyester-MXD6 blends. Japanese Laid Open Patent Application No. 3-193325, 23 Aug. 1991, is a follow on to U.S. Pat. No. 4,957,980 and discloses that the dispersibility of a thermoplastic polyester component (A) and a meta-xylylene group containing polyamide component (B) and transparency is improved by adding a compatibilizer component (C) and that the yellow coloring as a result of adding component (C) is prevented by way of adding a cobalt compound (component D) thus allowing a transparent molded body for which coloring is prevented to be produced.

U.S. Pat. No. 4,499,262 to Fagerburg et al. discloses sulfo-modified polyesters that give an improved rate of acetaldehyde generation and a lower critical planar stretch ratio. Blends with polyamides were not discussed.

Japanese Pat. No. 2663578 B2 to Katsumasa et al. discloses the use of 0.5 to 10 mole % 5-sulfoisophthalte copolymers as compatibilizer of polyester-MXD6 blends. No color data was given.

The use of a transition metal catalyst to promote oxygen scavenging in polyamide multilayer containers, and blends with PET, has been disclosed in the following patents, for example.

U.S. Pat. Nos. 5,021,515, 5,639,815 and U.S. Pat. No. 5,955,527 to Cochran et al. disclose the use of a cobalt salt as the preferred transition metal catalyst and MXD6 as the preferred polyamide. There is no data on the color or haze of the polyamide blends.

U.S. Pat. Nos. 5,281,360 and 5,866,649 to Hong, and U.S. Pat. No. 6,288,161 to Kim discloses blends of MXD6 with PET and a cobalt salt catalyst. There is no data on the color or haze of the polyamide blends.

U.S. Pat. No. 5,623,047 to Yuo et al. discloses the use of a catalyst composition containing an alkali metal acetate, preferably 30 ppm cobalt acetate to mask the yellowness in polyesters polymerized from terephthalic acid.

U.S. Pat. Application 2003/0134966 A1 to Kim et al. discloses the use of cobalt octoate and xylene group-containing polyamides for use in multi-layer extrusion blow-molding for improved clarity. Extrusion blow-molding minimizes the orientation of the polyamide domain size compared to injection stretch blow molding containers. No color data is given.

U.S. Pat. No. 7,943,216 alleges that the ionic compatibilizer, in combination with a cobalt salt significantly reduces the yellowness of the resin, preform and container.

SUMMARY OF THE INVENTION

The present invention is an improvement over polyester/polyamide blends known in the art in that these compositions have a bright blue hue.

In the broadest sense the present invention comprises a polyester-cobalt compound with a basic alkaline metal compound and optionally a phosphorous compound.

In the broadest sense the present invention comprises a compatibilized blend of polyester-cobalt compound and a partially aromatic polyamide with an ionic compatibilizer, a basic alkaline metal compound, e.g. alkaline metal base or basic alkaline metal salt, and optionally phosphorous.

The broadest scope of the present invention also comprises a container that has both active and passive oxygen barrier and carbon dioxide barrier properties at an improved color and clarity than containers known in the art.

In the broadest sense the present invention also comprises a container in which the balance of gas barrier properties and color can be independently balanced.

In the broadest sense the present invention provides a method to blend polyester and polyamides with an ionic compatibilizer and a cobalt salt.

In the broadest sense, the present invention provides for the use of cobalt compounds and alkaline metal compounds to be melt blended with polyester or polymerized with polyester or mixed via combination of melt blending and polymerizing to increase and control the blueness of the polyester relative to the addition of the cobalt compound alone.

More specifically this invention is to the control using a composition comprising a polyester polymer comprising terephthalate moities reacted with one or more glycols and at least 85% of the terephthalate moities are derived from a reaction of terephthalic acid or its dimethyl ester with the at least one or more glycols, a plurality of alkaline metal ions derived from at least one alkaline metal salt or base compound; and a plurality of cobalt ions having a positive metal charge, wherein at least some of the cobalt ions are free cobalt ions; wherein the total amount of cobalt ions are present at an amount selected from the group consisting of at least 0.2 mmoles, of at least 0.3 mmoles, of at least 0.4 mmoles, of at least 0.7 mmoles, of at least 1.3 mmole, and of at least 2.0 mmoles per kilogram of the composition, and the mole ratio of the alkaline metal ions to the free cobalt ions is in the range having a lower ratio selected from 1:10, 3:10, 5:10, 6:10; 7:10 and an upper ratio selected from the group consisting of 5:1, 4:1, 3:1, and 2:1.

It is further disclosed that the composition further comprise a plurality phosphorous ions wherein the molar ratio of the total amount of phosphorous ions to the total amount of cobalt ions is in the range selected from the group consisting of greater than 0:1 to 1.7:1, greater than 0:1 to 1.5:1, greater than 0:1 to 1.2:1, greater than 0:1 to 1.1:1, greater than 0:1 to 1.0:1, greater than 0:1 to 0.8:1 and greater than 0:1 to 0.6:1.

The composition may further comprise an ionic compatibilizer derived from sulfo-isophthalic acid or its dimethyl ester. The ionic compatibilizer may be a metal sulfonate derived from the sulfo-isophthalic acid or its dimethyl ester and the metal of the metal sulfonate salt may not be lithium.

The composition may also be void of an ionic compatibilizer, or the ionic compatibilizer may be void of lithium.

The ionic compatibilizer, if present, may be in a range from about 0.1 to about 2.0 mole % of the polyester polymer. The amount of the cobalt ions in the composition is in a range from about 20 to about 500 ppm based upon the weight of the composition.

The composition may further comprises a partially aromatic polyamide. The partially aromatic polyamide can be selected from the group consisting of poly (metaxylene adipamide)(MXD6), poly(hexamethylene isophthalamide), poly(hexamethylene adipamide-co-isophthalamide), poly(hexamethylene adipamide-co-terephthalamide), poly(hexamethylene isophthalamide-co-terephthalamide), and mixtures of two or more of these.

The cobalt ions are derived from a cobalt salt selected from the group consisting of cobalt neodecanoate, cobalt acetate, cobalt chloride, cobalt oleate, cobalt linoleate, cobalt octoate, cobalt stearate, fatty acids and mixtures of two or more of these.

The plurality of alkaline metal ions can be selected from the group consisting of Na+, Ca++, and K+ or mixtures thereof. The plurality of alkaline metal ions may not be exclusively lithium.

DETAILED DESCRIPTION OF THE INVENTION

Compositions of the present invention include an a polyester-cobalt compound.

The composition may also be described as a polyester polymer comprising terephthalate moities reacted with one or more glycols and at least 85% of the terephthalate moities are derived from a reaction of terephthalic acid or its dimethyl ester with the at least one or more glycols, with a plurality of alkaline metal ions derived from at least one alkaline metal salt; and a plurality of cobalt ions having a positive metal charge, wherein at least some of the cobalt ions are free cobalt ions; wherein the total amount of cobalt ions are present at an amount selected from the group consisting of at least 0.2 mmoles, of at least 0.3 mmoles, of at least 0.4 mmoles, of at least 0.7 mmoles, of at least 1.3 mmole, and of at least 2.0 mmoles per kilogram of the composition, and the mole ratio of the alkaline metal ions to the free cobalt ions is in the range having a lower ratio selected from 1:10, 3:10, 5:10, 6:10; 7:10 and an upper ratio selected from the group consisting of 5:1, 4:1, 3:1, and 2:1.

Generally polyesters can be prepared by one of two processes, namely:

(1) the ester process and
(2) the acid or ester process.

The ester process is where a dicarboxylic ester (such as dimethyl terephthalate) is reacted with ethylene glycol or other diol in an ester interchange reaction. Because the reaction is reversible, it is generally necessary to remove the alcohol (methanol when dimethyl terephthalate is employed) to completely convert the raw materials into monomers.

Certain catalysts are well known for use in the ester interchange reaction. In the past, catalytic activity was then sequestered by introducing a phosphorus compound, for example polyphosphoric acid, at the end of the ester interchange reaction. Primarily the ester interchange catalyst was sequestered to prevent yellowness from occurring in the polymer.

According U.S. Pat. No. 7,943,216, and well known in the art, the catalysts used for ester interchange are the acetates of zinc and manganese.

Then the monomer undergoes polycondensation and the catalyst employed in this reaction is generally an antimony, germanium or titanium compound, or a mixture of these. According U.S. Pat. No. 7,943,216, anitmony tri-oxide is an example of such a catalyst, called an additive.

According to U.S. Pat. No. 7,943,216, in the second method for making polyester, a di-acid (such as terephthalic acid) is reacted with a diol (such as ethylene glycol) by a direct esterification reaction producing monomer and water. This reaction is also reversible like the ester process and thus to drive the reaction to completion one must remove the water. According to U.S. Pat. No. 7,943,216 the direct esterification step does not require a catalyst. The monomer then undergoes polycondensation to form polyester just as in the ester process, and the catalyst and conditions employed are generally the same as those for the ester process.

For most container applications this melt phase polyester is further polymerized to a higher molecular weight by a solid state or solid phase polymerization (SSP).

In summary, in the ester process there are two steps, namely: (1) an ester interchange, and (2) polycondensation. In the acid or ester process there are also two steps, namely: (1) direct esterification, and (2) polycondensation According to U.S. Pat. No. 7,943,216 the direct esterification step does not require a catalyst. One of ordinary skill knows this very well and does not use a catalysts such as the acetate of zinc or manganese in the manufacture of an acid produced polyester. However, U.S. Pat. No. 7,943,216 is not enabling to the acid or ester process for its claimed synergy. In fact, in reviewing U.S. Pat. No. 7,943,216, it can be seen that the only acid resin is resin A, but it is blended with S2 and a Cobalt Masterbatch, therefore, there are no examples supporting a purely acid based polyester.

It is therefore a purpose of this invention to provide polyester-cobalt composition and method to make such a composition. It is believed that the composition comprises a polyester-cobalt compound wherein the cobalt is coordinated with the carboxyl groups of the polyester.

Suitable polyesters are those produced from the reaction of a diacid comprising at least 65 mol-% terephthalic acid, preferably at least 70 mol-%, more preferably at least 75 mol-%, even more preferably, at least 95 mol-%, and a diol component comprising at least 65% mol-% ethylene glycol, preferably at least 70 mol-%, more preferably at least 75 mol-%, even more preferably at least 95 mol-%. It is also preferable that the diacid component is terephthalic acid and the diol component is ethylene glycol, thereby forming polyethylene terephthalate (PET). The mole percent for all the diacid component totals 100 mol-%, and the mole percentage for all the diol component totals 100 mol-%.

The polyester-cobalt compound of this invention can also be described as a polyester wherein the polyester-cobalt compound comprises acid moities, preferably terephthalate, reacted with one or more glycols and at least 85% of the acid moities are derived from a reaction of a diacid with the at least one or more glycols. More preferably at least 90% of the di-acid moities, preferably terephthalate moities, are derived from a reaction of a diacid, preferably terephthalic acid, with the at least one or more glycols. More preferably at least 95% of the acid moities, preferably terephthalate moities, derived from a reaction of a diacid, preferably terephthalic acid, with the at least one or more glycols. Most preferably 100% of the acid, preferably terephthalate, moities are derived from a reaction of a diacid, preferably terephthalic acid, with the at least one or more glycols.

Where the polyester is modified by one or more diol components other than ethylene glycol, suitable diol components of the described polyester may be selected from 1,4-cyclohexanedimethanol, 1,2-propanediol, 1,4-butanediol, 2,2-dimethyl-1,3-propanediol, 2-methyl-1,3-propanediol (2MPDO) 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis or trans configuration or as mixture of both forms. Preferred modifying diol components are 1,4-cyclohexanedimethanol or diethylene glycol, or a mixture of these.

Where the polyester is modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like.

Also particularly contemplated by the present invention is a modified polyester made by reacting at least 85 mol-% terephthalate from either terephthalic acid, and any of the above diacid comonomers with the at least one diol.

In addition to polyester made from terephthalic acid and ethylene glycol, or a modified polyester as stated above, the present invention also includes the use of 100% of an aromatic diacid such as 2,6-naphthalene dicarboxylic acid or bibenzoic acid, and a modified polyester made by reacting at least 85 mol-% of the dicarboxylate from these aromatic diacids with any of the above comonomers.

The present invention may also includes the use of up to 0.5 mole percent tri and higher functional acids or alcohols.

What has been discovered that against the teachings of U.S. Pat. No. 7,943,216 and common knowledge to keep additives out of the acid or ester process, certain additive when used in combination with a proper cobalt compound will create a bright blue composition, at least brighter blue as measured by Hunter b* than the blue provided by the composition without the alkaline base metal. It has also been found that the composition, believed to comprise a polyester-cobalt compound, will be more blue regardless of the presence of an ionic compatibilizer, such as sulfoisophthalic acid or a polyamide or other oxygen scavenger or blend component. Thus the invention is operative in the absences of an ionic compatabilizer or when the composition is void of an ionic compatabilizer which is less than 0.1 mole percent.

In its simplest form, the polyester-cobalt composition can be made as follows.

A base, preferable a basic alkaline metal compound, e.g. alkaline metal base or basic alkaline metal salt, or alkaline metal base, such as Lithium Acetate, sodium acetate, lithium hydroxide, and sodium hydroxide can be introduced during, preferably at the beginning of, the polyester polymerization reaction of the acid or ester process. During polymerization under vacuum the acetate is believed driven off in the form of acetic acid leaving the lithium ion, for example, to coordinate with the carboxyl group of the polyester. When the polyester is blended with a cobalt salt, such as cobalt neodecanoate, the cobalt and lithium ions are believed to establish an equilibrium between the carboxyl of the polyester and the counterion of the cobalt salt. That is, at least some of the cobalt ions are removed from the neodecanoate and are replaced by lithium ions, creating lithium neodecanoate, and the cobalt moves and complexes with the carboxyl of the polyester, creating the polyester-cobalt compound. The same is true for sodium ions.

The change in color is both visual and dramatic. Whereas, the polyester with just the cobalt salt does not have the bright blue color. That the cobalt is believed to be part of the polyester molecule can be demonstrated by the back titration of the polyester-cobalt compound/composition with a strong acid. When exposed to p-toluene sulfonic acid, the polyester-cobalt compound/composition returns to its natural color because the cobalt has been removed from the carboxyl groups of polyester and become part of the p-toluene sulfonic acid.

The alkaline metal ion may be any alkaline metal ion, including lithium, potassium and sodium, provided that the alkaline metal ion introduced from an ionic compatibilizer, if present, is not included as an operative form of the alkaline metal. In other words, the alkaline metal ion must be present in addition to any alkaline metals associated or derived from the ionic compatibilizer. The amount of alkaline metal ions are present in the polyester-cobalt composition at a level selected from the group consisting of at least 0.2 mmoles, of at least 0.3 mmoles, of at least 0.4 mmoles, of at least 0.7 mmoles, of at least 1.3 mmole, and of at least 2.0 mmoles per kilogram of polyester, wherein the alkaline metal ions are not associated with or derived from an ionic compatabilizer. As discussed above, the molar amount of the basic alkaline metal compound must be greater than the molar amount of any strong acid optionally added to exhibit the improved color effect.

In addition to metal ions with +1 charge, Cesium, Et4N, Bu4N, Magnesium, Calcium might be useful. Any base compound will creates the bluing effect. To use a base, the moles of alkali metal ions or replaced with the moles of base add to the composition.

The phosphorous, which is optional, can be added as an active phosphorous compound, such as polyphosphoric acid, phosphoric acid, or triethly phosphate, for example. An active phosphorous compound is a compound containing phosphorous, such as a phosphorous salt, and is a compound capable of reacting with the metal ions present in the polyester-cobalt matrix. FeP (iron phosphide), is not an active phosphorous compound as it is well known that FeP is inert to the metal ions in the polyester. In running the process, one is interested in keeping the molar ratio of the amount of moles of phosphorous to moles of cobalt ions in a range selected from the group consisting of 0 to 1.7, 0 to 1.5, 0 to 1.2, 0 to 1.1, 0 to 1.0, 0 to 0.8, and 0 to 0.6. Phosphorous when present would be in the range selected from the group consisting of greater than 0 to 1.7, greater than 0 to 1.5, greater than 0 to 1.2, greater than 0 to 1.1, greater than 0 to 1.0, greater than 0 to 0.8, and greater than 0 to 0.6.

It is noted that while the above example polymerizes the polyester in the presence of the base, ideally the basic alkaline metal compound. Example 1 of the experimental section points out that the same effect is achieved by blending the cobalt and alkali metal base compounds into polyester without polymerization.

The composition may also contain a polyamide. Preferably the polyamide used as the gas barrier component of the blend is selected from the group of partially aromatic polyamides is which the amide linkage contains at least one aromatic ring and a non-aromatic conjugate. Preferred partially aromatic polyamides include: poly(m-xylylene adipamide); poly(hexamethylene isophthalamide); poly(hexamethylene adipamide-co-isophthalamide); poly (hexamethylene adipamide-co-terephthalamide); poly (hexamethylene isophthalamide-co-terephthalamide); or mixtures of two or more of these. The most preferred is poly(m-xylylene adipamide), alternatively known as MXD6 nylon.

The preferred range of polyamide is 1 to 10% by weight of the composition depending on the required gas barrier required for the container. 2 to 8% by weight of the composition is also preferred, with 3 to 8% by weight of the composition most preferred for the upper ranges and 1 to 5% by weight for the lower ranges.

The ionic compatibilizer is preferably a copolyester containing a metal sulfonate salt group attached to an aromatic nucleus. The metal ion of the sulfonate salt may be Na+, Li+, K+, Zn++, Mn++, Ca++ and the like. The metal ions from the sulfonate group may be multiple ions from multiple different sulfonate groups.

The composition may be void of any metal ions derived from sulfonate groups. The composition may have metal ions from sulfonate groups which are not exclusively lithium, i.e. a mixture of lithium and other ions. The composition may be void of a lithium ions derived from sulfonate groups.

Preferably, the aromatic acid nucleus is sulfophthalic acid, sulfoterephthalic acid, sulfoisophthalic acid, 4-sulfonaphthalene-2,7-dicarboxylic acid, and their esters. Most preferably, the sulfomonomer is 5-sodiumsulfoisophthalic acid, 5-lithium sulfoisophthalic acid or 5-zincsulfoisophthalic acid and most preferably their dialkyl esters such as the dimethyl ester (SIM) and glycol ester (SIPEG). The preferred range of 5-sodiumsulfoisophthalic, 5-lithium sulfoisophthalic acid or 5-zincsulfoisophthalic acid to reduce the haze of the container is 0.1 to 2.0 mol-% based upon the total moles of acid moities in the polymer.

Suitable cobalt compounds for use with the present invention include, but are not limited to those cobalt compounds which have an acid conjugate. Such compounds include, but are not limited to those selected from the group consisting of cobalt propionate, cobalt neodecanoate, cobalt acetate, cobalt carbonate, cobalt chloride, cobalt oleate, cobalt linoleate, cobalt octoate, cobalt stearate, cobalt salt of a fatty acid which includes cobalt salts of short, medium and long chain fatty acids, or mixtures of two or more of these, among others.

As a transition metal catalyst for active oxygen scavenging, a cobalt salt of a medium chain or long chain fatty acid is preferred. For color control of passive gas barrier blends any cobalt compound can be used, with cobalt acetate being preferred.

Color can be adjusted by varying the amount of moles of alkaline base metal ion or base in the composition relative to the amount of moles free cobalt ions in the composition. Free cobalt ions are those which are not bound to phosphorous, such as described in RE-32765, the teachings of which are incorporated in their entirety. In other words, the moles of cobalt in excess of the moles of cobalt that will react with or are reacted the phosphorous ions. A shorthand way of doing this is to use the total number of moles of cobalt, less the stoichiometric amount of phosphorous that is available to react with the cobalt to react with the phosphate. Attention must be paid to the addition order as The preferred range of cobalt ions for blends containing the partially aromatic polyamide and 0.1 to 2.0 mol-% of an ionic compatibilizer based upon the moles of acids or glycol moieties in the polyester is 20 to 500 ppm of cobalt relative to the weight of the amount of polyester plus nylon. The alkaline metal ion not associated with or derived from the ionic compatibilizer is preferably present in an amount of at least 0.3 mmoles per kilogram of polyester-cobalt compound, noting that all the cobalt which is not reacted with the phosphorous has been complexed with the polyester, thus the moles of polyester cobalt compound equals the moles of cobalt not reacted with the phosphorous, also known as the free cobalt.

Although not required, additives may be used in the polyester/polyamide blend. Conventional known additives include, but are not limited to an additive of a dye, pigment, filler, branching agent, reheat agent, anti-blocking agent, antioxidant, anti-static agent, biocide, blowing agent, coupling agent, flame retardant, heat stabilizer, impact modifier, UV and visible light stabilizer, crystallization aid, lubricant, plasticizer, processing aid, acetaldehyde and other scavengers, and slip agent, or a mixture thereof.

The polyester-cobalt composition (compound) can be conveniently prepared by polymerizing a polyester in the presence of the basic alkaline metal compound, e.g. alkaline metal base or basic alkaline metal salt, having an acid conjugate and then adding the cobalt as a cobalt salt to the finished polymer via melt addition such as late addition to the reactor, during pelletizing, or later in an extrusion step such as at the throat of the injection molding machine that produces a preform that can be stretch blow molded into the shape of the container. The addition order is not important, as the polyester could be polymerized it the presence of the cobalt compound and the base, such as the alkaline metal base, added after polymerization.

The ionic compatibilizer can be copolymerized into the acid based polyester as indicated in US 20070088133.

If a conventional polyester base resin designed for polyester containers is used, then one method is to prepare a master batch of a polyester containing the ionic compatibilizer, and optionally a cobalt compound, together with the partially aromatic polyamide using a gravimetric feeder for the three components. Alternatively the polyester resin can be polymerized with an ionic compatibilizer, and optionally a transition metal catalyst for active scavenging, to form a copolymer. This copolymer can be mixed at the injection molding machine with the partially aromatic nylon. Alternative all the blend components can be blended together, or as a blend of master batches, and fed as a single material to the extruder. The mixing section of the extruder should be of a design to produce a homogeneous blend.

It is also contemplated, that the addition of the basic alkaline metal to a polyester composition already containing cobalt, or the addition of a basic alkali metal plus cobalt compound could occur via melt mixing during the recycling or recovery process where the polyester resin is known to yellow due to heat history and other ingredients. The use of the basic alkaline metal in conjunction with the cobalt provides an inexpensive way to control the color of the polyester composition. Thus the use of a basic alkaline metal compound in conjunction with a cobalt salt is contemplated. The basic alkaline metal compound or base is added to recycled polyester/polyamide containing cobalt. The addition of the basic compound can be used to control the color of the final melt blended composition when added according to the teachings of this specification.

In the contemplated process, when the recycled polyester resin, which is polyester resin obtained from polyester preforms and/or polyester bottles is pelletized it must pass through an extruder. During the extrusion process, the base, or alkali metal base, is added to the polyester and melt mixed into the composition. If cobalt is not present, cobalt, in the form of a cobalt salt as described above can be added and melt mixed as well. The ratio of base to cobalt can be controlled so that the proper color is obtained.

The ingredients of the cobalt compound and basic alkaline metal compound can also be melt blended into the polyester polymer to make the composition. The composition may be free of ionic compatibilizers as well.

EXPERIMENTAL

The following experiments establish that the presence or use of Sodium Acetate (NaAc, NaOAc, Na-Acetate) in combination with cobalt salts in either PET or PET-SIPA dramatically shifts the b* of the resulting composition in the blue direction (−b*).

I. PET with Cobalt and Na.

The first set of experiments demonstrate the effect of cobalt (Co-neodeconoate) and Na-Stearate combined with a commercial grade PET-CLEARTUF 8006.

In this first set of experiments, PET, without SIPA, was melt blended into preforms having an average b* of +5.74.

The PET, without SIPA, was then blended with Co-Neodecanoate at a level of 100 ppm Cobalt in the final preform resulting in a preform b* of +1.26. Thus, the visually blue Co-Neodecanoate at 100 ppm Co, shifted the b* in the blue direction −4.48 b* units (5.74 to 1.26).

The PET was then blended with Co-Neodecanoate at 100 ppm cobalt AND Na-Stearate at the level of 30 ppm sodium (Na) to yield a preform having a b* of −3.72. Na-Stearate is colorless and is known to yellow PET. But as the data shows, the color shift in the presence of cobalt plus Na-Stearate is greater than the shift due to the addition of Cobalt alone, indicating a contribution from the Na-Stearate. The fact that 30 ppm Na shifted the b* an additional −4.98 b* units to −3.72 indicates a significant contribution from basic alkali metal Na, from sodium stearate.

The next experiment melt blended 60 ppm Na, in the form of Na-stearate with PET and cobalt neodecanoate at 100 ppm Cobalt to produce a preform having a b* −8.24. The resultant effect of the sodium at 60 ppm in combination with Cobalt at 100 pm is and additional shift of −8.70 b* units compared to the addition of Cobalt alone.

TABLE I

| | b* | Reduction due to Cobalt | Reduction due to Na-Stearate |
|---|---|---|---|
| PET | +5.74 | | |
| PET + Cobalt (100 ppm) | +1.26 | −4.48 (1.26 − 5.74) | |
| PET + Cobalt (100 ppm) + 30 ppm Na | −3.72 | | −4.98 (−3.72 − 1.26) |
| PET + Cobalt (100 ppm) + 60 ppm Na | −8.24 | | −9.5 (−8.24 − 1.26) |

These results indicate that at least 50% if not more of the b* shift can come from the addition of the sodium.

II. SIPA-PET with Na-Acetate (without MXD6).

This next series of experiments demonstrates that the presence of the basic alkali metala sodium, as Na-Acetate, at even very low amounts has a dramatic effect on the b* values of the SIPA-PET resins. The three resins used were, PET 8006C, and two SIPA-PET resins each containing 1.3 mole % SIPA. The difference was that one SIPA containing resin was polymerized with approximately 165 ppm Na-Acetate trihydrate (27.9 ppm Na), the other polymerized without Na-Acetate. Again, Co-Stearate, was added to reach the level of 100 ppm cobalt in the final mixture.

In this set of experiments, the preforms made from the 8006C PET resin had a b* of 2.75. This resin was blended with the 1.3 mole % SIPA-PET without the Na-Acetate to achieve blends having 0.13, 0.26 and 0.5 mole percent SIPA respectively. As evident from Table II, there is almost a linear increase of b* with the mole % SIPA. NOTE: all ppm Na from Na-Acetate are nominal calculated values.

TABLE II

| Without Na-Acetate Without Cobalt | 0 mole % SIPA | 0.13 mole % SIPA | 0.26 mole % SIPA | 0.5 mole % SIPA |
|---|---|---|---|---|
| b* | 2.75 | 4.45 | 6.24 | 9.28 |

Table III shows the blends of PET with the 1.3 mole % SIPA-PET having 165 ppm Na-Acetate. Table IV compares the results of Tables II and III.

TABLE III

| With Na-Acetate Without Cobalt | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| b* | | 3.07 | 3.48 | 4.29 |

TABLE IV

| Without Cobalt | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| b*, no Na-Acetate | 2.75 | 4.45 | 6.24 | 9.28 |
| b*, with Na-Acetate | | 3.07 | 3.48 | 4.29 |
| Effect of Na-Acetate | | −1.38 | −2.76 | −4.99 |

Again, there is an almost linear, negative relationship between the Na-Acetate level and b* of the blends. As can be seen, the addition of the Na-Acetate almost completely eliminates the color contribution of the SIPA to the final blend.

In the next set of preforms, Cobalt, in the form of Co-Stearate is added to achieve 100 ppm Cobalt level for all the preforms. Table V shows the effect.

TABLE V

| Without Na-Acetate 100 ppm Cobalt | 0 mole % SIPA (PET) | 0.13 mole % SIPA | 0.26 mole % SIPA | 0.5 mole % SIPA |
|---|---|---|---|---|
| b*, no Na-Acetate | −4.20 | −3.44 | −0.79 | +1.94 |

As with the previous data without Cobalt, the preform color almost linearly increases with increasing amounts of the SIPA-PET without Na-Acetate.

TABLE VI

| With Na-Acetate 100 ppm Cobalt | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| b*, with Na-Acetate | | −6.77 | −6.30 | −4.87 |

TABLE VII

Composite b* of 100 ppm Cobalt, with and without Na-Acetate

| 100 ppm Cobalt | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| b*, no Na-Acetate | −4.20 | −3.44 | −0.79 | +1.94 |
| b*, with NaAc | | −6.77 | −6.30 | −4.87 |
| Effect of Na-Acetate | | −3.33 | −5.51 | −6.81 |

As can be seen from Table VII, the presence of the Na-Acetate, in combination with cobalt shifts the b* to the blue (−b*). The data can be recast to show the combined effects as in Table VIII.

TABLE VIII

| | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| WITHOUT COBALT | | | | |
| b*, without Na-Acetate | 2.75 | 4.45 | 6.24 | 9.28 |
| b*, with Na-Acetate | | 3.07 | 3.48 | 4.29 |
| Effect of Na-Acetate | | −1.38 | −2.76 | −4.99 |
| WITH 100 ppm COBALT | | | | |
| b*, without Na-Acetate | −4.72 | −3.44 | −0.79 | +1.94 |
| b*, with NaAc | | −6.77 | −6.30 | −4.87 |
| Effect of Na-Acetate | | −3.33 | −5.51 | −6.81 |

The b* shift due to the Na-Acetate is much greater when in the presence of Cobalt.

III. Impact of 5% MXD6.

The same set of experiments were repeated with 5% MXD6 added to the blend.

In this set of experiments, the preforms made from the PET resin had a b* of 3.52. This resin was blended with the 1.3 mole % SIPA-PET without the Na-Acetate achieve blends having 0.13, 0.26 and 0.5 mole percent SIPA. The color of the preforms is shown in the Table IX. As is evident, there is almost a linear increase of b* with the mole % SIPA.

TABLE IX

| Without Na-Acetate Without Cobalt 5% MXD6 | 0 mole % SIPA | 0.13 mole % SIPA | 0.26 mole % SIPA | 0.5 mole % SIPA |
|---|---|---|---|---|
| $b^*$ | 3.52 | 4.13 | 7.38 | 11.8 |

The next set of preforms were a blend of the PET with the 1.3 mole % SIPA having 165 ppm Sodium Acetate. Table X shows the data

TABLE X

| With Na-Acetate Without Cobalt 5% MXD6 | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| $b^*$ | 3.52 | 2.90 | 4.29 | 5.35 |

TABLE XI

COMPARISON OF

| Without Cobalt 5% MXD6 | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| $b^*$, no Na-Acetate | 3.52 | 4.13 | 7.38 | 11.80 |
| $b^*$, with Na-Acetate |  | 2.90 | 4.29 | 5.35 |
| Effect of Na-Acetate |  | −1.23 | −3.09 | −6.45 |

While the absolute values may have shifted with the presence of MXD6, the effect of the Na-Acetate in the blend on the b* color shows an almost linear relationship.

In the next set of preforms, Cobalt, in the form of Co-Stearate is added to achieve 100 ppm Cobalt level for all the preforms.

TABLE XII

| Without Na-Acetate 100 ppm Cobalt 5% MXD6 | 0 mole % SIPA (PET) | 0.13 mole % SIPA | 0.26 mole % SIPA | 0.5 mole % SIPA |
|---|---|---|---|---|
| $b^*$ | −4.34 | −2.73 | −0.64 | +4.12 |

As with the previous data without Cobalt, the preform color almost linearly increases with increasing amounts of the SIPA-PET without Na-Acetate.

TABLE XIII

| With Na-Acetate 100 ppm Cobalt 5% MXD6 | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| $b^*$ |  | −5.18 | −3.58 | −2.29 |

TABLE XIV

| 100 ppm Cobalt | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| $b^*$, no Na-Acetate | −4.34 | −2.73 | −0.64 | +4.12 |
| $b^*$, with Na-Acetate |  | −5.18 | −3.58 | −2.29 |
| Effect of Na-Acetate |  | −2.45 | −2.94 | −6.41 |

As can be seen, the presence of the Na-Acetate, in combination with cobalt reduced the b*

The data can be recast to show the combined effects

TABLE XV

| 5% MXD6 | 0 mole % SIPA 0 ppm Na from Na-Acetate | 0.13 mole % SIPA 2.9 ppm Na from Na-Acetate | 0.26 mole % SIPA 5.6 ppm Na from Na-Acetate | 0.5 mole % SIPA 10.6 ppm Na from Na-Acetate |
|---|---|---|---|---|
| WITHOUT COBALT |  |  |  |  |
| $b^*$, without Na-Acetate | 3.52 | 4.13 | 7.38 | 11.8 |
| $b^*$, with NaAc |  | 2.90 | 4.29 | 5.35 |
| Effect of Na-Acetate |  | −1.23 | −3.09 | −6.45 |
| WITH 100 ppm COBALT |  |  |  |  |
| $b^*$, without Na-Acetate | −4.34 | −2.73 | −0.64 | +4.12 |
| $b^*$, with Na-Acetate |  | −5.18 | −3.58 | −2.29 |
| Effect of Na-Acetate |  | −2.45 | −2.94 | −6.41 |

IV. Melt Polymerization Applicability

The general process is that an amount of terephthalic acid was pre-reacted with ethylene glycol to form a low molecular weight heel, called an E-T heel. The E-T heel was charged, as a ground solid to a glass tube reactor. Also charged was isophthalic acid and ethylene glycol in an amount sufficient to react the isophthalic acid with the E-T heel. A typical charge was 100 grams of E-T heel and 1.02 grams of isophthalic acid (IPA) with ethylene glycol (about 1.20 mole % of IPA on the total acids). The material was heated to 150° C. and purged with nitrogen. After reaching 150° C., a solution of LiOAc, an alkaline base metal, in ethylene glycol ([Li ion]=1% wt) was charged to the reactor. In one instance, the amount of lithium ions, added as an acetate, was only 0.005 parts per thousand (5 ppm) in the final product. This corresponds to 0.05 grams of the 1% by weight lithium solution in ethylene glycol. The amount of lithium acetate added is noted as ppm lithium and corresponds to 0.72 millimole alkaline metal compound (or alkaline metal)/kg of polymer.

After adding the lithium acetate, the mixture was heated to 260° C. and held at that temperature for 30 minutes. The following was then added to the reactor: a) 0.12 g of a solution of $H_3PO_4$ in ethylene glycol (1% by weight Phosphorous in ethylene glycol) and b) antimony as antimony glycolate. The final concentration of phosphorous in the polyester was 12 ppm and the concentration of antimony was 265 ppm. (In example 6, no phosphorous was added).

Vacuum was applied to the system to begin the polymerization step. When full vacuum was reached the temperature was increased to 275° C. and the polymerisation continued until the Intrinsic Viscosity of the polyester was about 0.6 dl/g.

Cobalt ions, in the amount of 110 ppm cobalt ions in the final product, were added by breaking the vacuum with nitrogen and adding the cobalt ions in the form of cobalt neodecanoate pastilles and mixing for approximately 5 minutes.

The polymer was extracted from the glass reactor and analyzed.

To produce the polyester with lithium sulfoisophthalic acid copolymerized into the polymer, the sulfoisophthalic acid was first pre-reacted with glycol to form the bis hydroxyethyl ester. The concentration of sulfoisophthalic bis hydroxyethyl ester was about 40% wt in ethylene glycol. Such solution of bis-ester was then diluted with ethylene glycol and added to the reactor in one of two ways. One way was to dilute the bis-ester with ethylene glycol to 20% wt and add it to the heel at 150° C. after the nitrogen purge. The other way was to dilute the bis-ester with ethylene glycol to 5% wt and add it to the mixture immediately prior to the introduction of the vacuum (polymerization cycle). In some instances, an additional amount of lithium acetate was added immediately prior to putting the reactor under vacuum.

There were many examples run to demonstrate this effect. Tables 1 lists the most relevant examples establishing the invention.

To review, the heel for runs 2, 6, and 7/19, was heated and if present, esterified with the isophthalic acid in the presence of 0.005 ppt lithium added as 1% by weight in ethylene glycol. For runs 2, 7/19 an additional 0.045 ppt of Lithium, as 1% by weight in ethylene glycol was added immediately prior to polymerization.

From the data, it is apparent that the greater the alkaline metal ion, the more intense the blue, less yellow, demonstrating the role of alkaline metal ion.

Although particular embodiments of the invention have been described in detail, it will be understood that the invention is not limited correspondingly in scope, but include all changes and modifications coming within the spirit and terms of the claims appended hereto.

TABLE XVI

| Sample ID | 2 | 6 | 7 | 19 |
|---|---|---|---|---|
| Formulation | 2 | 6 | 7 | 7 |
| TPA Heel gms | 100 | 100 | 100 | 100 |
| IPA gms | 1.02 | 0 | 1.54 | 1.54 |
| (LiSIPA bi-ester gms (Swenson 1B (39.9%)) for 0.5 mole % SIPA | 2.19 | 2.19 | 0 | 0 |
| $H_3PO_4$ (1% in EG) ppm P | 12 | 0 | 12 | 12 |
| Li(OAc) (1% in EG) ppm Li | 50 | 5 | 50 | 50 |
| Sb ($O_3$ in EG) ppm Sb | 265 | 265 | 265 | 265 |
| Co as Co neodecanoate ppm Co | 110 | 110 | 110 | 110 |
| IV | 0.468 | 0.581 | | 0.559 |
| COOH | 28 | 41 | | 22 |
| L* | 28.6 | 17.61 | | 25.43 |

TABLE XVI-continued

| Sample ID | 2 | 6 | 7 | 19 |
|---|---|---|---|---|
| a* | 1.35 | −0.14 | | 2.43 |
| b* | −9.8 | −4.88 | | −15.3 |

We claim:

1. A process for improving the color by lowering the b* of a polyester resin composition comprising a partially aromatic polyamide and a cobalt compound having free cobalt ions wherein the polyester resin is obtained from polyester preforms or polyester bottles, said process including the steps of:
   A. Extruding the polyester resin composition comprising the partially aromatic polyamide and the cobalt compound, wherein the amount of free cobalt ions present in the polyester resin composition is in the range of 20 to 500 ppm based upon the weight of the polyester resin composition;
   B. Melt mixing an amount of a base into the polyester resin comprising the partially aromatic polyamide and the cobalt compound during the extruding step A, and
   C. Pelletizing the extruded polyester resin comprising the partially aromatic polyamide and the cobalt compound;
   wherein the base is an alkali metal base having alkaline metal ions wherein the mole ratio of alkaline metal ions to free cobalt ions is in the range of 1:10 to 3:1, and the alkaline metal ions are not associated with or derived from a sulfonate group.

2. The process according to claim 1, wherein the cobalt compound is a cobalt salt.

3. The process according to claim 1, wherein the alkali metal base having alkaline metal ions is selected from the group consisting of lithium acetate, sodium acetate, lithium hydroxide and sodium hydroxide.

4. A process for improving the color by lowering the b* of a polyester resin composition comprising a partially aromatic polyamide wherein the polyester resin comprising the partially aromatic polyamide is obtained from polyester preforms or polyester bottles, said process including the steps of:
   A. Extruding the polyester resin comprising the partially aromatic polyamide,
   B. Melt mixing an amount of a base and an amount of a cobalt compound into the polyester resin comprising the partially aromatic polyamide during the extruding step A, wherein the amount of cobalt is sufficient to have free cobalt ions present in the polyester resin with the amount of free cobalt ions in the range of 20 to 500 ppm based upon the weight of the polyester resin composition and
   C. Pelletizing the extruded polyester resin comprising the partially aromatic polyamide;
   wherein the base is an alkali metal base having alkaline metal ions wherein the mole ratio of alkaline metal ions to free cobalt ions is in the range of 1:10 to 3:1, and the alkaline metal ions are not associated with or derived from a sulfonate group.

5. The process according to claim 4, wherein the cobalt compound is a cobalt salt.

6. The process according to claim 4, wherein the alkali metal base having alkaline metal ions is selected from the group consisting of lithium acetate, sodium acetate, lithium hydroxide and sodium hydroxide.

* * * * *